US009261212B2

(12) United States Patent
Eley et al.

(10) Patent No.: US 9,261,212 B2
(45) Date of Patent: Feb. 16, 2016

(54) SWIVEL CONNECTOR FOR A FLUID HANDLING SYSTEM

(75) Inventors: Craig D. Eley, Lincoln, NE (US); Darin Schollmeyer, Creighton, NE (US)

(73) Assignee: ELEY CORPORATION, Lincoln, NE (US)

( * ) Notice: Subject to any disclaimer, the term of this patent is extended or adjusted under 35 U.S.C. 154(b) by 989 days.

(21) Appl. No.: 13/294,322

(22) Filed: Nov. 11, 2011

(65) Prior Publication Data

US 2013/0118607 A1  May 16, 2013

(51) Int. Cl.
*F16L 27/08* (2006.01)
*B65H 75/44* (2006.01)

(52) U.S. Cl.
CPC ........ *F16L 27/0828* (2013.01); *B65H 75/4478* (2013.01); *F16L 27/0824* (2013.01); *B65H 2701/33* (2013.01); *Y10T 137/6954* (2015.04)

(58) Field of Classification Search
CPC .............. F16L 27/0824; F16L 27/0828; F16L 27/0832; B65H 75/34
USPC ............. 137/355.16, 355.26, 355.27; 285/98, 285/148.4, 272, 275
See application file for complete search history.

(56) References Cited

U.S. PATENT DOCUMENTS

| 3,744,721 | A | * | 7/1973 | Baumstark, Jr. | ............... 239/261 |
| 3,822,620 | A | * | 7/1974 | Willen | ............... 82/158 |
| 4,229,024 | A | * | 10/1980 | Oberrecht et al. | ............... 285/98 |
| 4,478,435 | A | * | 10/1984 | Cheshier et al. | ............... 285/39 |
| 4,676,267 | A | * | 6/1987 | Bloch | ............... 137/355.27 |
| 6,604,543 | B1 | * | 8/2003 | Guo | ............... 137/355.27 |
| 6,637,454 | B1 | * | 10/2003 | Eley | ............... 137/355.26 |
| 6,752,433 | B2 | * | 6/2004 | Frost | ............... 285/98 |

* cited by examiner

*Primary Examiner* — Kevin Murphy
(74) *Attorney, Agent, or Firm* — Perkins Coie LLP

(57) ABSTRACT

A swivel connector includes a rotor that is rotatably coupled with a housing stem. In some embodiments a bearing cup is rotatably coupled at one end with an exterior surface of the rotor and anchored at an opposite end with the housing stem. An O-ring seal is positioned between the housing stem and the exterior surface of the rotor. In other embodiments, the bearing cup is rotatably coupled at one end with an exterior surface of the housing stem and anchored at an opposite end with the rotor. In such embodiments an O-ring seal is positioned between the rotor and the exterior surface of the housing stem. A bearing assembly residing within a raceway that is defined by flat surfaces on each of: the rotor, the housing stem, and an interior bearing wall within the bearing cup.

18 Claims, 8 Drawing Sheets

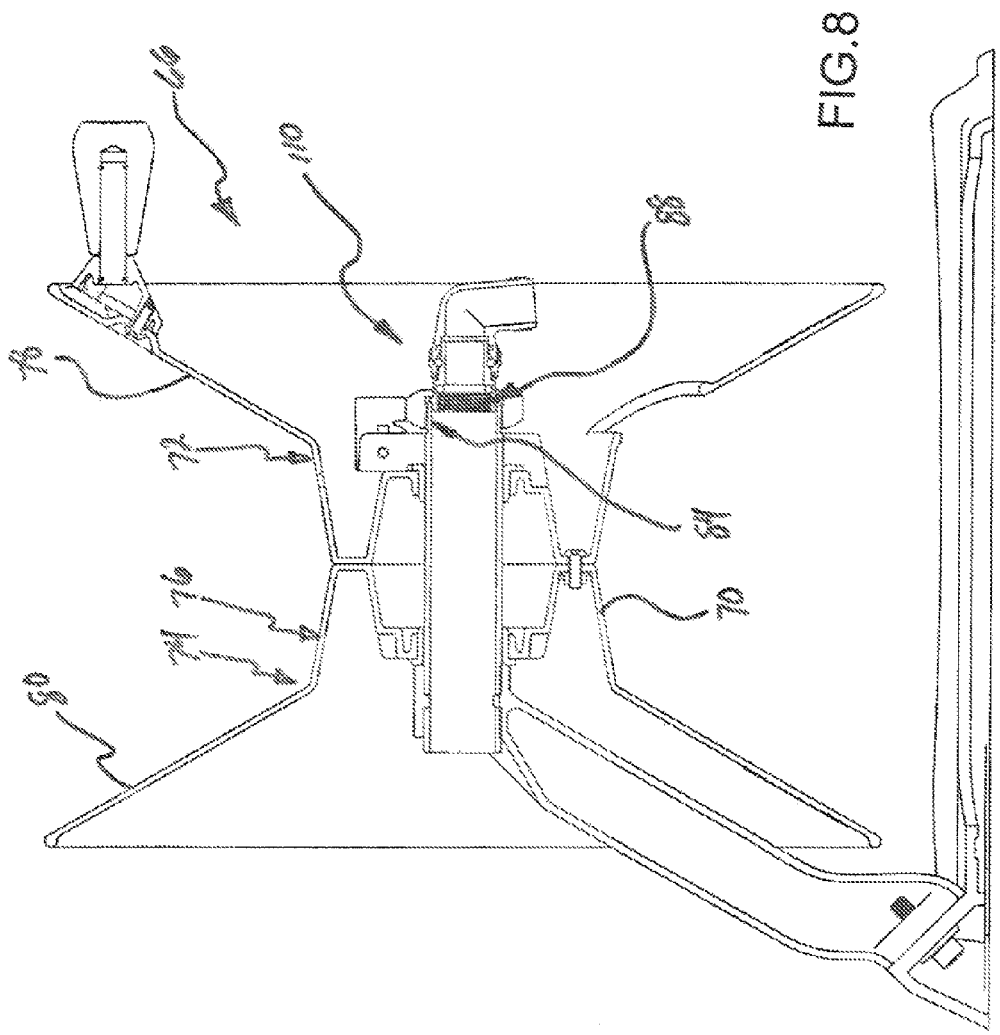

SWIVEL CONNECTOR FOR A FLUID HANDLING SYSTEM

BACKGROUND

Reels are commonly used to wind fluid delivery lines, such as hoses, that are used in a number of operations that involve fluid handling. Examples of the type of fluids that may need to he handled include water, lubricants, solvents, coolants, and various gases. The reels used in such operations typically employ the use of a swivel for connecting a fluid supply line to the fluid service line, which is wound around the reel. The swivel allows for the winding and unwinding of the service line, not only for ease in using and storing the service line, but also to prevent damage to the same.

Reels are typically supported on axles that further serve as a means to allow the rotation of the reel by the user. While the reel is rotating, the axle is kept in a stationary position. Similarly, the fluid source line, which extends from a fluid source such as a water faucet, must be kept in a stationary position to prevent the twisting or damaging of the line. The swivel allows the connection between the stationary fluid source line and the rotating fluid service line. However, current swivel connectors are either a complex assembly of intricate parts, which increase associated costs and maintenance issues, or made from inferior designs that are limited in use and require frequent repair. Leaking swivels has become a common problem in the hose and reel industry, ranking among the top complaints by users of inferior designs.

In many prior art swivel designs, the rotor and housing rotate with respect to one another in a less than accurate fashion. Frequently, there is a fair amount of concentric play between the rotor and the housing, which is a significant contributor to leaks. In an attempt to provide a swivel that does not leak, various prior art designs increase the pressure on the O-ring seals within the swivel assembly. One problem with this design approach, however, is that the increased pressure on the O-rings also increases the torque required to rotate the swivel. This oftentimes causes premature wear on the O-rings, which can shorten the life of the swivel and cause premature leaking; the very condition the design sought to avoid. Moreover, such increased torque in prior designs can cause the user's hose to kink.

Prior swivel designs are also difficult to assemble. Conventional designs typically include an interrupting feature in the bearing raceway, such as a bearing opening that is cross-drilled into the raceway. Such a design makes it more difficult to assemble, which will cause an end user trouble when it is time to replace a failed O-ring seal. This may happen routinely, increasing the operational costs to the user. With prior art designs, this is a fairly complicated repair in the field and may cause more problems than it resolves.

Another design shortcoming with the bearing raceways of prior swivel designs is the level of operational friction generated by the raceways during use. Conventional raceway designs are mostly circular in cross-section and sized just larger than the diameter of the bearings used therein. Accordingly, each bearing within such a raceway engages the surface of the raceway around an entire circumferential portion of the bearing. When multiplied by several bearings within a single swivel design, the amount of friction becomes significant. Moreover, such designs typically require high precision machining, which increases manufacturing costs and the potential for faulty swivel assemblies.

SUMMARY

This Summary is provided to introduce a selection of concepts in a simplified form that arc further described below in the Detailed Description. This Summary, and the foregoing Background, is not intended to identify key aspects or essential aspects of the claimed subject matter. Moreover, this Summary is not intended for use as an aid in determining the scope of the claimed subject matter.

A swivel connector of the present technology is provided for use within a wide array of fluid handling systems that may incorporate the use of a reel, axle, fluid source line, and fluid delivery line. Generally, the swivel connector will include a housing stem, having an open first end portion and an open second end portion, and a rotor, having an open first end Onion and an open second end portion. The second end portion of the housing stem is placed in open fluid communication with the first end portion of the rotor, which is positioned so that the rotor may freely rotate with respect to the housing stem on a common axis extending through a length of the housing stem.

The swivel connector may include a bearing cup, having an open opposite end portions and an open interior portion. In some embodiments, a rotor end portion of the bearing cup is coaxially, rotatably coupled with an exterior surface of the rotor. A threaded inner diameter of the opposite, housing stem end portion of the bearing cup is coupled with a threaded portion of an exterior surface of the housing stem, allowing the bearing cup to he advanced and withdrawn along a length of the housing stem to a desired position. A lock ring is provided to secure the position of the bearing cup along the threaded portion of the housing stem. In some embodiments, a bearing assembly is disposed within a bearing raceway, which is defined by a bearing channel in the exterior surface of the rotor, a bearing wall in the second end portion of the housing stem, and an interior bearing wall within the interior portion of the bearing cup. In some embodiments, at least portions of the bearing channel, bearing wall, and interior bearing wall are provided with flat engagement faces, which are positioned to engage each of the bearings of the bearing assembly at four discrete points.

In other embodiments, a housing stem end portion of the bearing cup is coaxially, rotatably coupled with an exterior surface of the housing stem. A threaded inner diameter of the opposite, rotor end portion of the bearing cup is coupled with a threaded portion of an exterior surface of the rotor, allowing the hearing cup to be advanced and withdrawn along a length of the rotor to a desired position. In some embodiments, a bearing assembly is disposed within a bearing raceway, which is defined by a bearing channel in the exterior surface of the housing stem, a bearing wall in the first end portion of the rotor, and an interior bearing wall within the interior portion of the bearing cup. In some embodiments, at least portions of the bearing channel, bearing wall, and interior bearing wall are provided with flat engagement faces, which are positioned to engage each of the bearings of the bearing assembly at four discrete points.

An O-ring seal is positioned between the housing stem and the rotor, whereby the passage of fluid from a fluid pathway of the housing stem to the interior portion of the bearing cup is substantially prevented. In some embodiments, the O-ring seal is positioned within an annular recess within one of the rotor or housing stem. In this position, the O-ring seal may be easily replaced in the field by a user. Embodiments of the swivel connector may include an O-ring dust seal that is disposed between the exterior surface of either the housing stem or the rotor and the bearing cup to substantially prevent dirt and other debris from entering the interior portion of the bearing cup and corning into contact with the bearing assembly.

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

FIG. 8 depicts a side elevation, cutaway view of the swivel connector depicted in FIG. 5 and depicts one manner in which the swivel connector could be coupled with a reel assembly.

DETAILED DESCRIPTION

Figure 1:
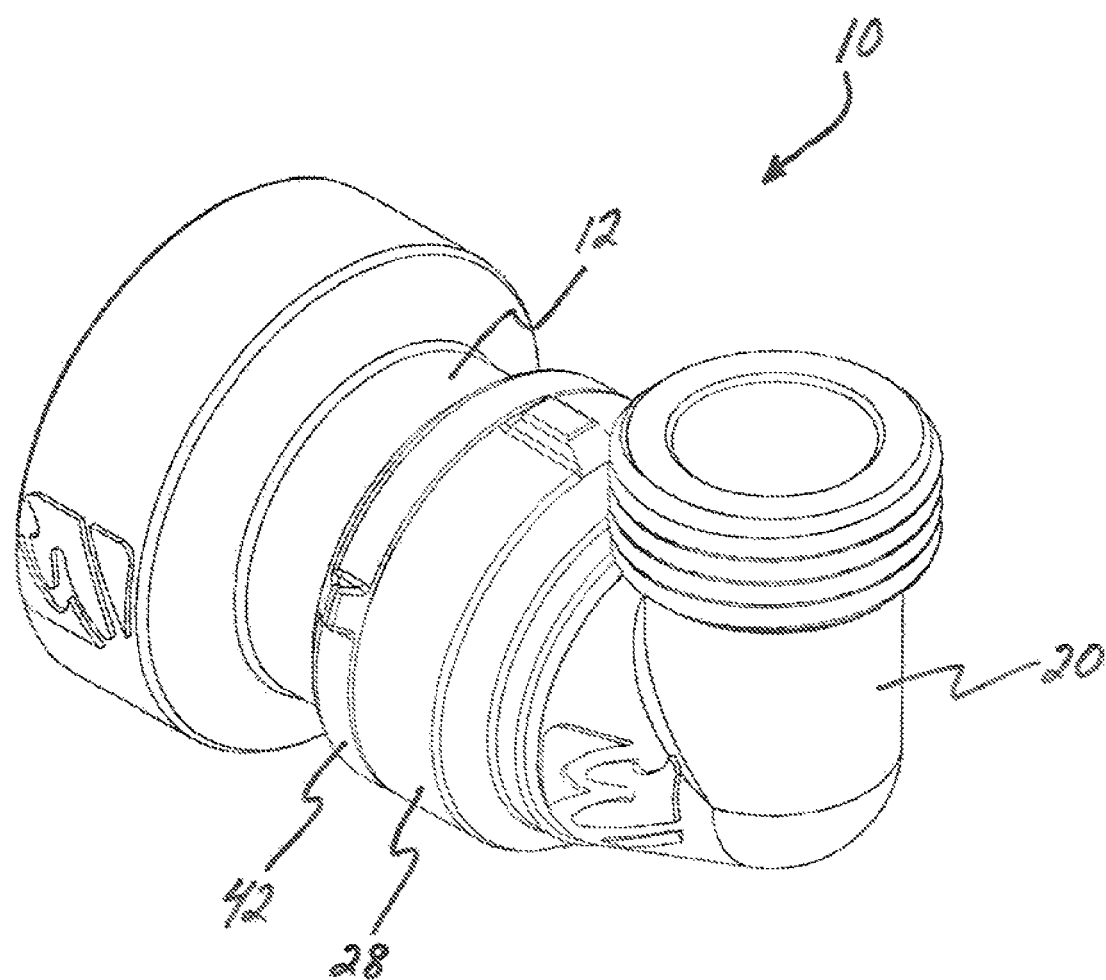
FIG. 1 depicts a front, perspective view of one embodiment of the swivel connector of the present technology.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

With reference to FIGS. 1-8, swivel connectors of the present technology may be used within a wide array of fluid handling systems that may incorporate the use of a reel, axle, fluid source line, and fluid delivery line. It is contemplated that the fluid handling system may be used in various operations that involve the handling of water, lubricants, adhesives, coolants, solvents, various gases, and other similar fluids. It will be understood by those skilled in the art that, as the application of the system is changed for the handling of different fluids, the materials used, such as the nature and grade of fluid lines used, will change accordingly. However, for purposes of description only, the fluid handling system and the swivel connectors 10 and 110, more specifically, will be described as it would be used for the handling of water in a residential application.

With reference to FIGS. 1-4, in some embodiments, a swivel connector 10 will include a housing stem 12, having an open first end portion 14 and an open second end portion 16. An open fluid pathway 18 extends between the first end portion 14 and the second end portion 16. The swivel connector 10 will further include a rotor 20, having an open first end portion 22 and an open second end portion 24. An open fluid pathway 26 extends between the first end portion 22 and the second end portion 24. The first end portion 22 of the rotor 20 is placed in open fluid communication with the second end portion 16 of the housing stem 12, whereby the open fluid pathway 26 of the rotor 20 is in open fluid communication with the fluid pathway 18 of the housing stem 12. The second end portion 16 of the housing stem 12 and the first end portion 22 of the rotor 20 will be positioned so that the rotor 20 may freely rotate with respect to the housing stem 12 on a common axis extending through a length of the housing stem 12.

Figure 2:
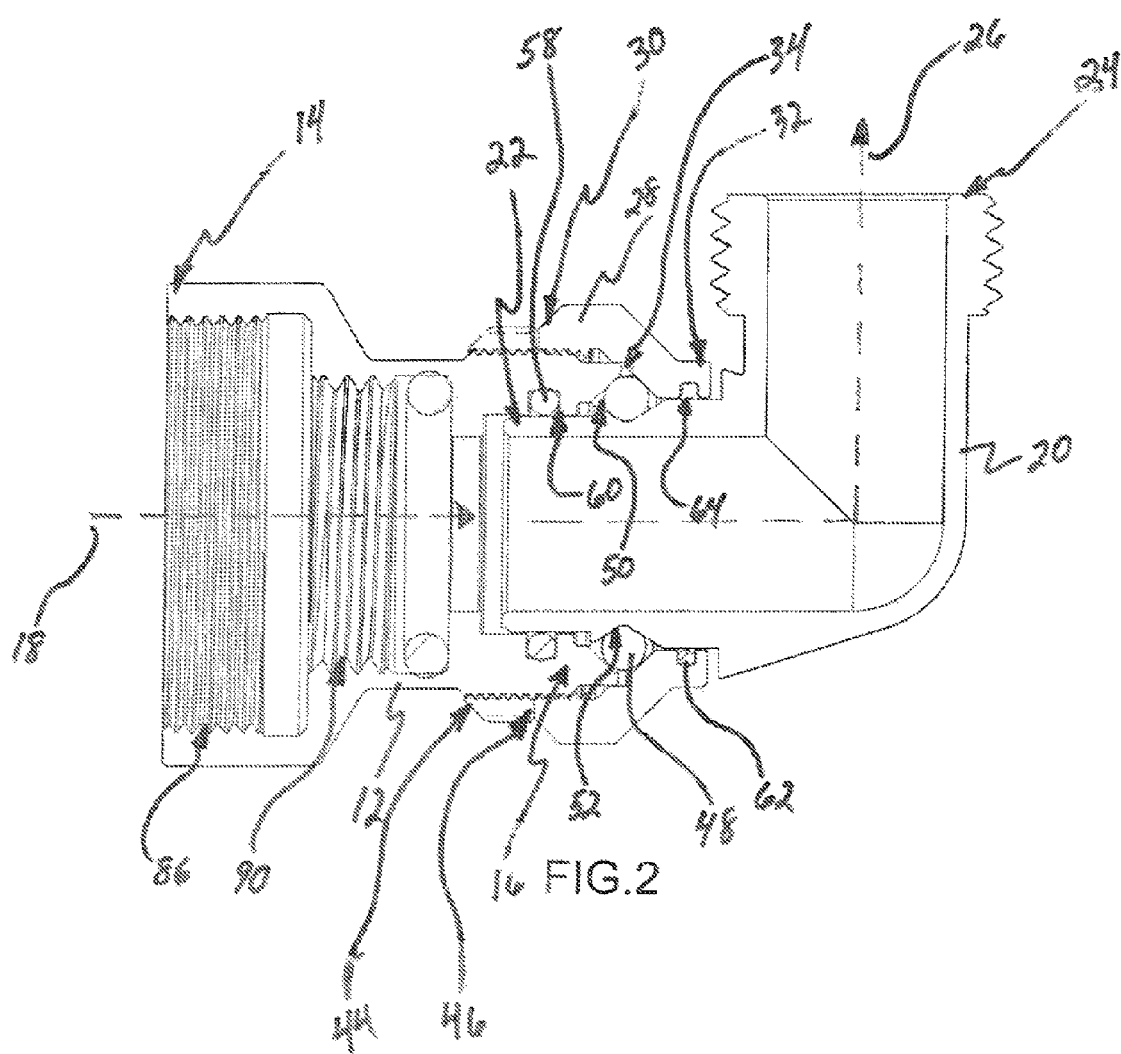
FIG. 2 depicts a side elevation, cutaway view of the swivel connector depicted in FIG. 1.
Figure 3:
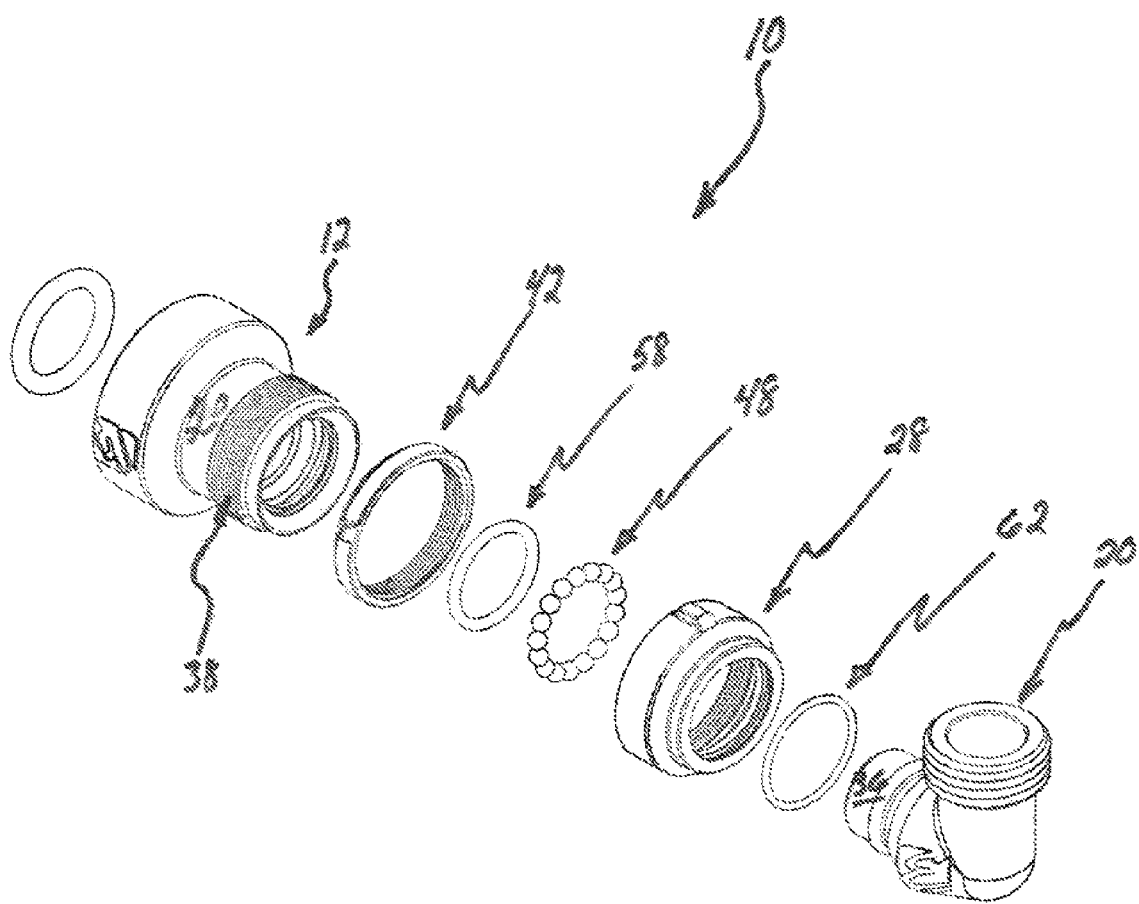
FIG. 3 depicts an exploded perspective view of the swivel connector depicted in FIG. 1.

In various embodiments, the swivel connector 10 will include a bearing cup 28 having an open housing stein end portion 30, an open rotor end portion 32, and an open interior portion 34. With reference to FIG. 2, the rotor end portion 32 of the bearing cup 28 is coaxially rotatably coupled with an exterior surface 36 of the rotor 20 between the first end portion 22 and second end portion 24 of the rotor 20. A threaded inner diameter of the housing stem end portion 30 of the bearing cup 28 is coupled with a threaded portion 38 of an exterior surface 40 of the housing stem 12, adjacent the second end portion 16 of the housing stem 12, allowing the bearing cup 28 to be advanced and withdrawn along a length of the housing stem 12 to a desired position. A lock ring 42, having an open first end portion 44 and an open second end portion 46 may be provided to secure the position of the bearing cup 28 along the threaded portion 38 of the exterior surface 40 of the housing stem 12. During an assembly method, the lock ring 42 is first coaxially coupled with the second end portion 16 of the housing stem 12, along the threaded portion 38. Once the bearing cup 28 is placed in a desired position along the threaded portion 38 of the housing stem 12, the lock ring 42 is advanced along the threaded portion 38 until its second end portion 46 is positioned snugly against the housing stem end portion 30 of the bearing cup 28.

A bearing assembly 48 is disposed within a bearing raceway 50. In various embodiments the bearing raceway 50 is defined by a bearing channel 52 in the exterior surface 36 of the rotor 20, a bearing wall 54 in the second end portion 16 of the housing stem 12, and an interior bearing wall 56 within the interior portion 34 of the bearing cup 28. Specifically, in some embodiments, at least portions of the bearing channel 52, bearing wall 54, and interior bearing wall 56 are provided with flat engagement faces. The bearing channel 52, for example, may be formed to have flat, opposing first and second walls that define a V-shape. Similarly, the bearing wall 54 in the first end portion 14 of the housing stem 12 and the interior bearing wall 56 within the interior portion of the bearing cup 28 may be provided as flat faces that oppose one another, generally defining a V-shape that is open toward an open end portion of the bearing channel 52 when the components of the bearing raceway 50 are each positioned in an assembled position.

While it is contemplated that the bearings within the bearing assembly 48 could be made from several different materials, such as hardened or stainless steel, some embodiments of the present technology form the hearings 48 from a plastic, such as Acetyl. The use of Acetyl bearings allows for a higher rate of rotation between the rotor 20 and the opposing structures such as the housing stem 12 and the bearing cup 28. The Acetyl bearings also tend to wear longer than their steel counterparts. Materials such as Acetyl have a coefficient of friction that is lower than the coefficient of friction of steel hearings. Accordingly, the Acetyl bearings may rub against one another with a lower instance of disintegration, unlike steel balls. The design of the previously described bearing raceway 50 and bearings 48 need only provide for axial load and not radial load. Prior swivel connector designs used the bearings within the assembly for both axial and radial loads. The high precision machining required for such an arrangement is obviated by the present design. The self-centering nature of the housing stem 12, rotor 20 and the bearing cup 28 supplies the radial load to the swivel connector 10 so that the bearings 48 can fit more loosely within the bearing raceway 50 and not affect the sealing nature of any O-rings disposed within the swivel connector 10.

In various embodiments, an O-ring seal 58 is positioned between the housing stem 12 and the exterior surface 36 of the rotor 20, whereby the passage of fluid from the fluid pathway 18 of the housing stem 12 to the interior portion 34 of the bearing cup 28 is substantially prevented. In some embodiments, the O-ring seal 58 is positioned within an annular recess 60 formed in an interior surface of the housing stem 12, adjacent the second end portion 16 of the housing stem 12. In this position, the O-ring seal 58 may be easily replaced in the field by a user. The lock ring 42 is first loosened, permitting removal of the bearing cup 28. This allows the withdrawal of the rotor 20, bearing cup 28 and bearing assembly 48 as a single unit and exposes the open second end portion 16 of the housing stem 12. The O-ring seal 58 may then be easily inspected and replaced. With a reassembly of the component parts to the swivel connector 10 in reverse order of the disassembly steps, the task of inspecting and replacing the O-ring seal may be accomplished by a user in the field in a couple of minutes or less.

With reference to FIG. 2, the sealing O-ring seal 58 is disposed in the annular channel 60 within the housing stem 12. The rotor 20 is held more concentric with the O-ring seal 58 due to the fact that the first end portion of the rotor 20, which engages the O-ring seal 58, is secured in its rotational alignment by the second end portion 16 of the housing stem 12 and the bearing cup 28. This design reduces the concentric play between the rotor 20 and the housing, stem 12, which contains the O-ring seal 58. Accordingly, the present design requires less pressure to be applied to the sealing O-ring 58 in order to create a water tight seal.

In various embodiments, the swivel connector includes an O-ring dust seal 62 that is disposed between the exterior surface 36 of the rotor 20 and the rotor end portion 32 of the bearing cup 28. In some embodiments, the O-ring dust seal 62 is at least partially disposed within an annular recess 64 formed within an interior surface of the bearing cup 28. A scaling surface of the O-ring dust seal 62 engages the rotating, exterior surface 36 of the rotor 20. The size and material of the O-ring dust seal 62 is chosen to simply provide a sufficient seal to substantially prevent dirt and other debris from entering the interior portion 34 of the bearing cup 28 and coming into contact with the bearing assembly 48.

It is contemplated that the swivel connector 10 may be used with reel assemblies of a nearly endless number of different designs. Commonly, however, a reel assembly 66 used with the swivel connectors 10 disclosed herein will be configured to support one or more lengths of generally flexible fluid delivery lines 68. Some examples of such fluid delivery lines 68 include hoses designed for the delivery of various gases, such as compressed air and liquids, such as water and other chemical compositions. Accordingly, irrespective of the specific design of the reel assembly 66, it is contemplated that the reel assembly 66 will include a line support section or hub 70 that extends between opposite end portions 72 and 74 of the reel assembly 66. The hub 70 may he shaped as a drum with a partially open or continuous exterior surface 76, which is adapted for supporting a length of the hose 68. Some reel assemblies may include a pair of opposing flanges 78 and 80 that project outwardly from the opposing end portions 72 and 74 of the reel assembly 66, to form an annular channel for receiving a length of the fluid delivery line 68. The reel assembly 66 will commonly include an axle 82, having opposite end portions, that is provided to extend coaxially with the hub 70 and he operatively coupled with the hub 70 in a manner that permits selective rotation of the hub 70 about the axle 82. Components of applicant's reel assembly, described in U.S. Pat. No. 7,389,790, issued on Jun. 24, 2008, and other currently pending U.S. patent applications, may provide an exemplary embodiment of a reel assembly 58 that may be used with the swivel connector 10 of the present technology.

In various embodiments, the swivel connector 10 is secured with an output end portion 84 of the axle 82. In this regard, housing mating threads 86 or other mechanical fastener features may be associated with an interior surface of the first end portion 14 of the housing stem 12. Likewise, axle mating threads 88 or other mechanical fastener features may be associated with the output end portion 84 of the axle 82. When the first end portion 14 of the housing stem 12 is coupled with the output end portion 84 of the axle 82, the swivel connector 10 is securely coupled with the axle 82 arid, hence, the reel assembly 66. Moreover, in this orientation, inlet mating threads 90 or other mechanical fastener features may be associated with an interior portion of the housing stem 12, between the housing mating threads 86 and the second end portion 16 of the housing stem 12. The inlet mating threads 90 may be coupled with a terminal end portion of a fluid supply line 92 that extends from a fluid source, such as a faucet, and is at least partially disposed within an open interior portion of the axle 82.

Figure 4:
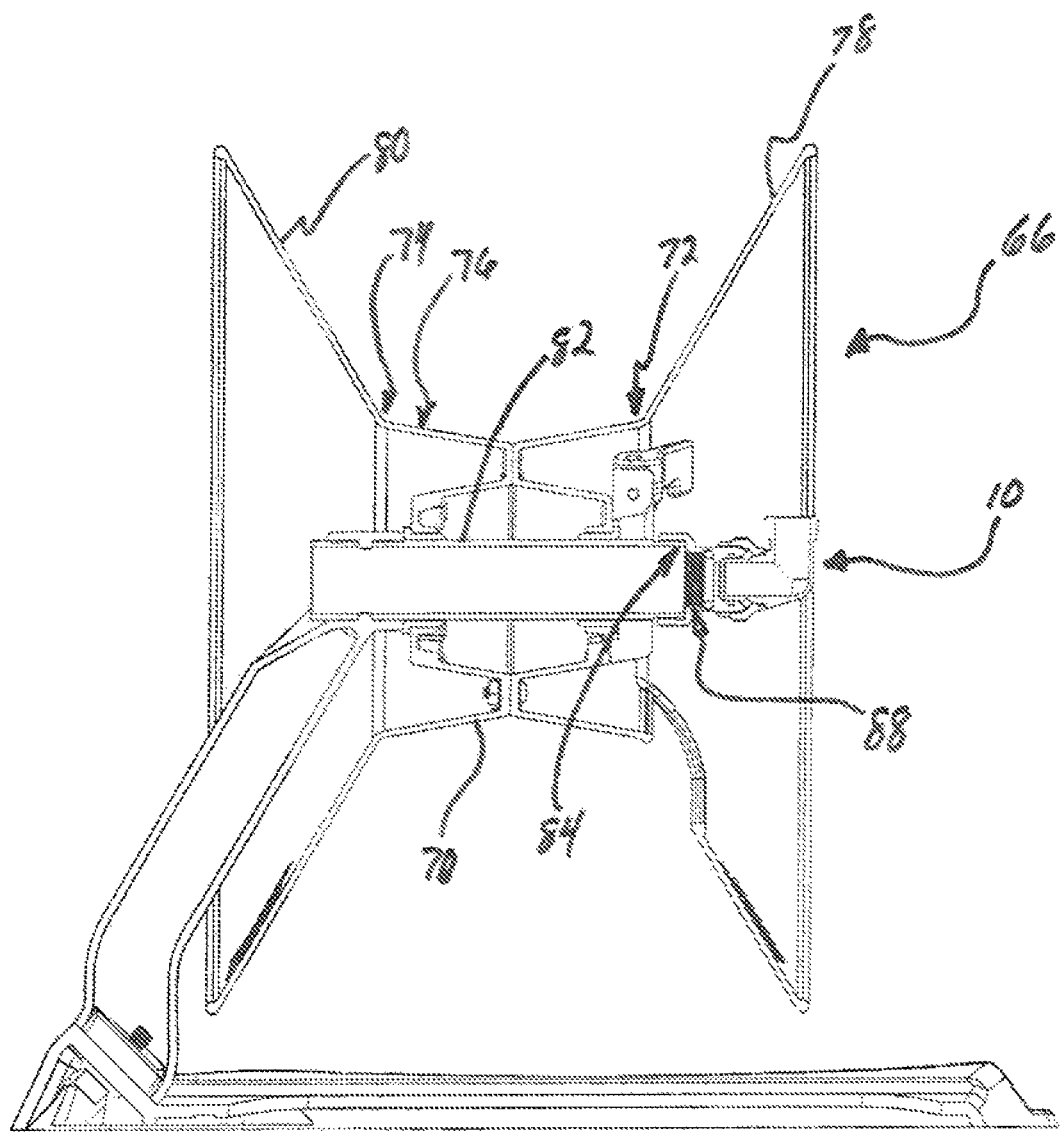
FIG. 4 depicts a side elevation, cutaway view of the swivel connector depicted in FIG. 1 and depicts one manner in which the swivel connector could he coupled with a reel assembly.
Figure 5:
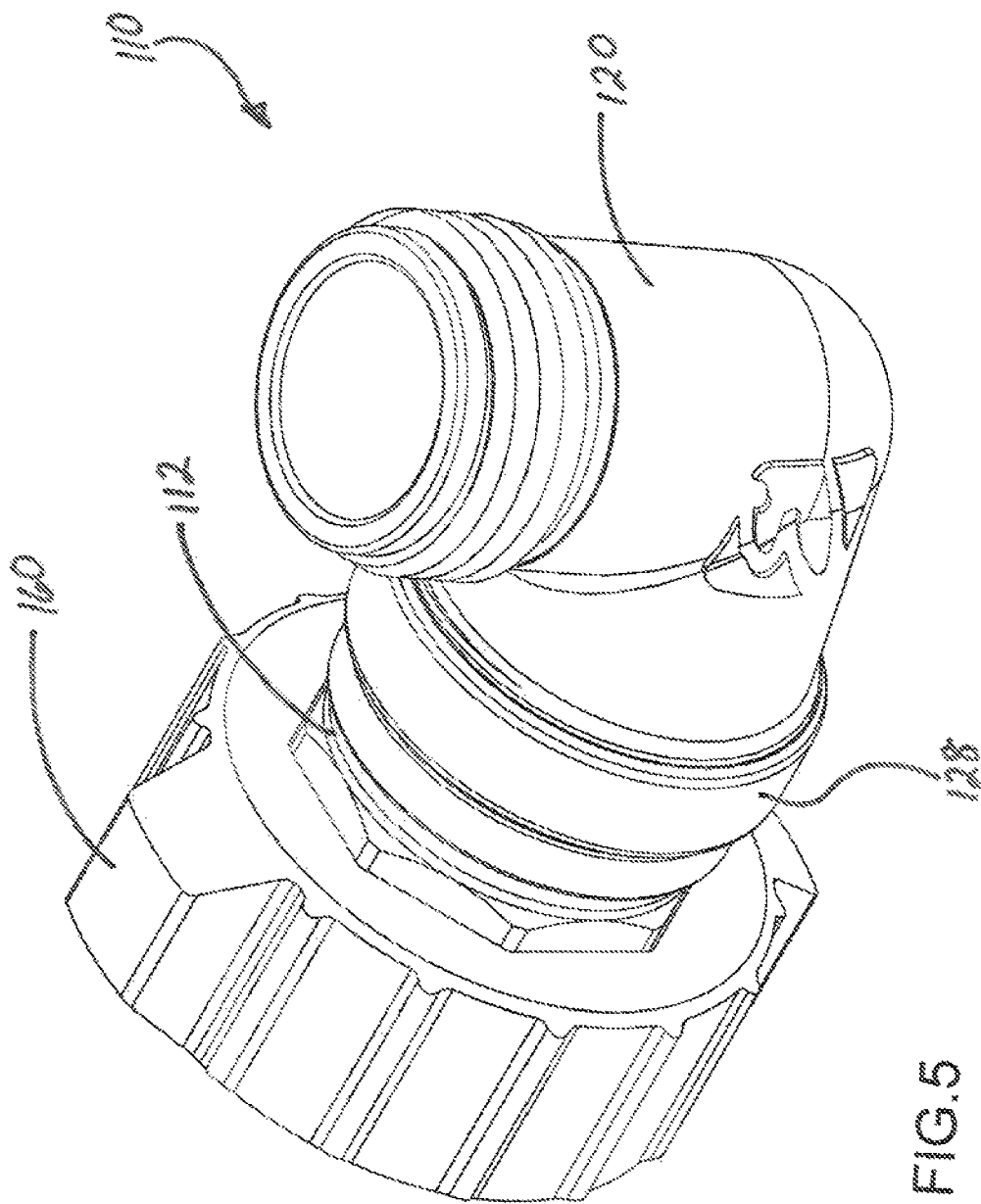
FIG. 5 depicts a front, perspective view of another embodiment of the swivel connector of the present technology.

With reference to FIG. 4, the swivel connector 10 extends freely from the first end portion 72 of the hub 70. In some embodiments, the second end portion 26 of the rotor 20 may be disposed at an angle with respect to a long axis of the axle 82. In at least one embodiment, the angle of the first end portion 24 of the rotor 20 approximates a 90 degree angle. One end portion of the fluid delivery line 68 may be coupled with the second end portion 26 of the rotor 20. A fluid delivery line opening 94 is provided to penetrate the first flange 78, adjacent the hub 70. Once the fluid delivery line 68 is passed through the fluid delivery line opening 94, it may be coiled about the hub 70 in a standard fashion. However, in some embodiments, the fluid delivery line 68 may be anchored to the hub 62 using a line retention system. It is contemplated that the line retention system may be provided in a variety of different designs that include a loop, which encircles an exterior of the fluid delivery line 68, and an anchoring structure that extends from the loop and is secured with the hub 70 or the first flange 78. The line retention system will prevent over stressing of the hardware of the present system, such as the swivel connector 10, when a user attempts to overextend the fluid delivery line 68 from the reel assembly 66.

With reference to FIGS. 5-8, various other embodiments of the present technology include swivel connector 110, which will include similar components to the swivel connector 10 with a slightly different arrangement of components. In some embodiments, a swivel connector 110 will include a housing stem 112, having an open first end portion 114 and an open second end portion 116. An open fluid pathway 118 extends between the first end portion 114 and the second end portion 116. The swivel connector 110 will further include a rotor 120, having an open first end portion 122 and an open second end portion 124. An open fluid pathway 126 extends between the first end portion 122 and the second end portion 124. The second end portion 116 of the housing stem 112 is placed in open fluid communication with the first end portion 122 of the rotor 120, whereby the open fluid pathway 126 of the rotor 120 is in open fluid communication with the fluid pathway 118 of the housing stem 112. However, in some embodiments, the second end portion 116 of the housing stem 112 is positioned to reside at least partially within the first end portion 122 of the rotor 120. In this position, the second end portion 116 of the housing stem 112 and the first end portion 122 of the rotor 120 are positioned so that the rotor 120 freely rotates with respect to the housing stem 112 on a common axis extending through a length of the housing stem 112.

Figure 6:
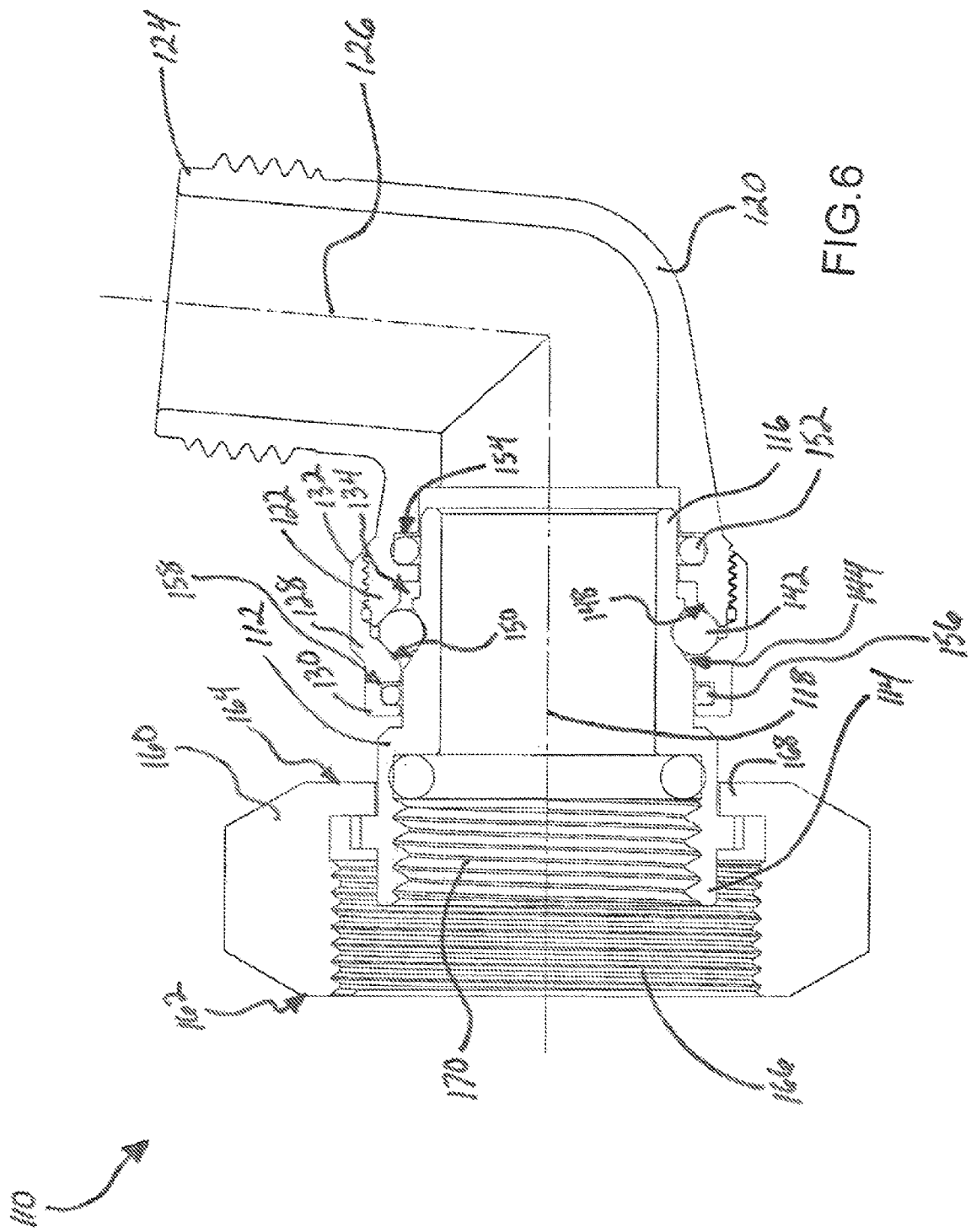
FIG. 6 depicts a side elevation, cutaway view of the swivel connector depicted in FIG. 5.
Figure 7:
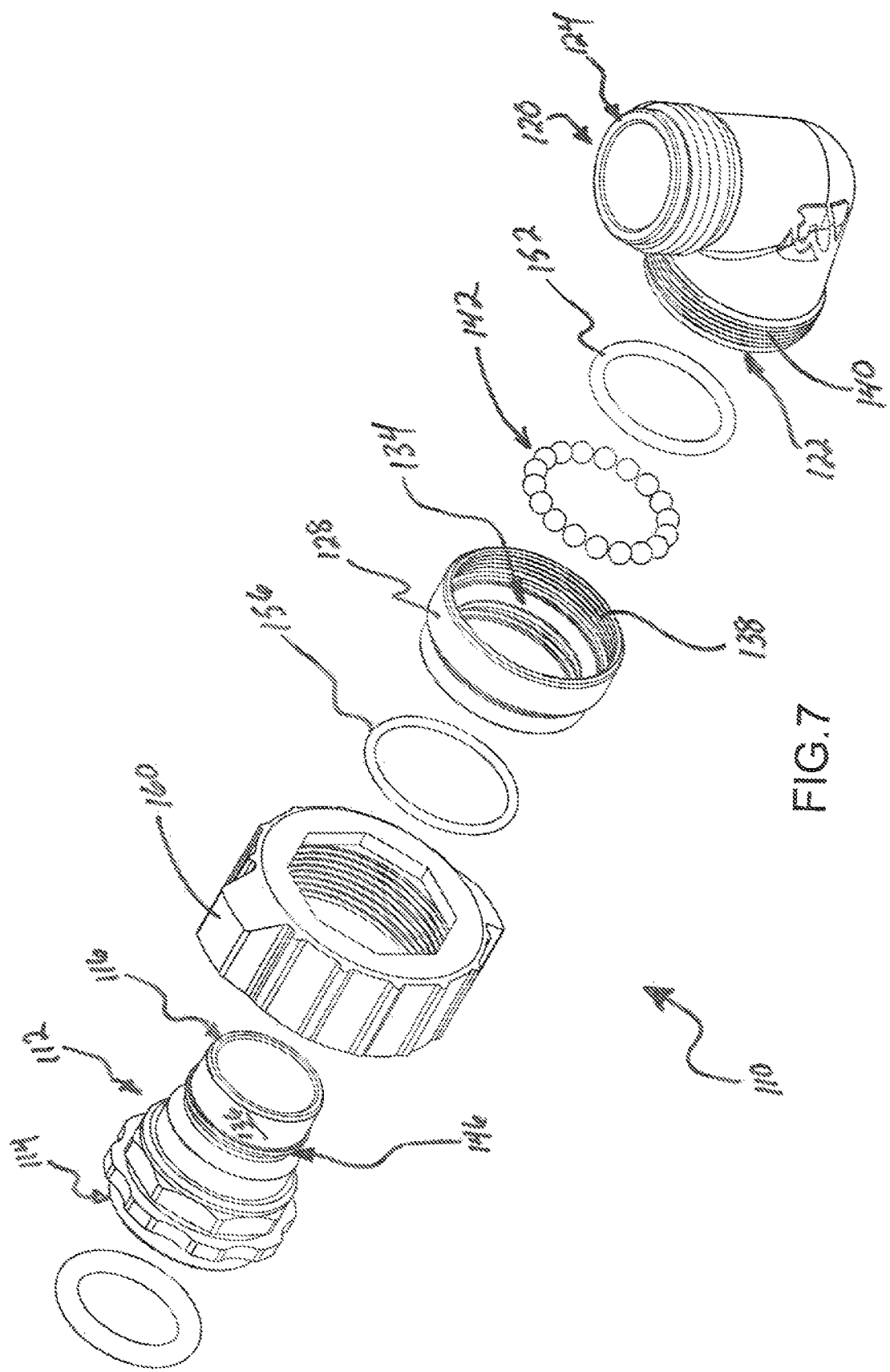
FIG. 7 depicts an exploded perspective view of the swivel connector depicted in FIG. 5.

In various embodiments, the swivel connector 110 will include a bearing cup 128, having an open housing stem end portion 130, an open rotor end portion 132, and an open interior portion 134. With reference to FIG. 6, the housing stem end portion 130 of the hearing cup 128 is coaxially, rotatably coupled with an exterior surface 136 of the housing stem 112 between the first end portion 114 and second end portion 116 of the housing stem 112. A threaded inner diameter of the rotor end portion 132 of the hearing cup 128 is coupled with a threaded portion 138 of an exterior surface 140 of the rotor 120, adjacent the first end portion 122 of the rotor 120, allowing the bearing cup 128 to be advanced and withdrawn along a length of the rotor 120 to a desired position. In some embodiments, an adhesive, such as Threadlocker from Loctite, may be used to secure the position of the rotor end portion 132 of the hearing cup 128 with respect to the threaded portion 138 of exterior surface 140 of the rotor 120.

A bearing assembly 142 is disposed within a bearing raceway 144. In various embodiments; the bearing raceway 144 is defined by a hearing channel 146 in the exterior surface 136 of the housing stem 112, a bearing wall 148 in the first end portion 122 of the rotor 120, and an interior bearing wall 150 within the interior portion 134 of the bearing cup 128. Specifically, in some embodiments, at least portions of the bearing channel 146, bearing wall 148, and interior bearing wall 150 are provided with flat engagement faces. The bearing channel 146, for example, may be formed to have flat, opposing first and second walls that define a V-shape. Similarly, the bearing wall 148 in the first end portion 122 of the rotor 120 and the interior bearing wall 150 within the interior portion of the bearing cup 128 may be provided as flat faces that oppose one another, generally defining a V-shape that is open toward an open end portion of the bearing channel 146 when the components of the bearing raceway 144 are each positioned in an assembled position. The bearing assembly 142 will include a plurality of bearings 148, which be Made from several different materials, such as hardened or stainless steel, or a plastic, such as Acetyl.

The design of the bearing raceway 144 is similar to the bearing raceway 50 of the previously described embodiment of the swivel connector 10, in that the bearings 148 within the bearing raceway 144 need only to provide for axial load and not radial load. Prior swivel connector designs used the bearings within the assembly for both axial and radial loads. The self-centering nature of the housing stem 112, rotor 120 and the bearing cup 128 supplies the radial load to the swivel connector 110 so that the bearings 148 can fit more loosely within the hearing raceway 144 and not affect the sealing nature of any O-rings disposed within the swivel connector 1.10.

In various embodiments, an O-ring seal 152 is positioned between the rotor 120 and the exterior surface 136 of the housing stem 112, whereby the passage of fluid from the fluid pathway 118 of the housing stem 112 to the interior portion 134 of the bearing cup 128 is substantially prevented. In some embodiments, the O-ring seal 152 is positioned within an annular recess 154 formed in an interior surface of the rotor 120, adjacent the first end portion 122 of the rotor 120. In this position, the O-ring seal 152 may be easily replaced in the field by a user. The bearing cup 128 is unthreaded from the rotor 120, which allows the withdrawal of the rotor 120 and exposes the open first end portion 122 of the rotor 120. The O-ring seal 152 may then be easily inspected and replaced. With a reassembly of the component parts to the swivel connector 110 in reverse order of the disassembly steps, the task of inspecting and replacing the O-ring seal 152 may be accomplished by a user in the field in a couple of minutes or less.

In various embodiments, the swivel connector 110 includes an O-ring dust seal 156 that is disposed between the exterior surface 136 of the housing stem 112 and the housing stem end portion 130 of the bearing cup 128. In some embodiments, the O-ring dust seal 156 is at least partially disposed within an annular recess 158 formed within an interior surface of the hearing cup 128. A sealing surface of the O-ring dust seal 156 engages the exterior surface 136 of the housing stem 112 as the rotor 120 and bearing cup 128 rotate. The size and material of the O-ring dust seal 156 is chosen to simply provide a sufficient seal to substantially prevent dirt and other debris from entering the interior portion 134 of the bearing cup 128 and coming into contact with the bearing assembly 142.

It is contemplated that, much like the swivel connector 10, the swivel connector 110 may be used with reel assemblies of a nearly endless number of different designs, including reel assembly 66 and one or more lengths of generally flexible fluid delivery lines 68. In various embodiments, the swivel connector 110 is secured with an output end portion 84 of the axle 82 using a lock nut 160, having an open first end portion 162 and an open second end portion 164. Mating threads 166 or other mechanical fastener features may be associated with an interior surface of the lock nut. Likewise, axle mating threads 88 or other mechanical fastener features may be associated with the output end portion 84 of the axle 82. When the first end portion 162 of the lock nut 160 is coupled with the output end portion 84 of the axle 82, the swivel connector 10 is securely coupled with the axle 82 and, hence, the reel assembly 66. An end wall 168 abuts flange 170, which radiates outwardly from the exterior of the first end portion 114 of the housing stem 112, to prevent the lock nut 160 from becoming unintentionally disengaged from the housing stem 112. In this orientation, inlet mating threads 170 or other mechanical fastener features may be associated with an interior portion of the housing stem 112, adjacent the first end portion 114 of the housing stem 112. The inlet mating threads 170 may be coupled with a terminal end portion of a fluid supply line 92 that extends from a fluid source, such as a faucet, and is at least partially disposed within an open interior portion of the axle 82.

With reference to FIG. 8, the swivel connector 110 extends freely from the first end portion 72 of the hub 70. In some embodiments, the second end portion 126 of the rotor 120 may be disposed at an angle with respect to a long axis of the axle 82. In at least one embodiment, the angle of the second end portion 126 of the rotor 120 approximates a 90 degree angle. One end portion of the fluid delivery line 68 may be coupled with the second end portion 126 of the rotor 120. The fluid delivery line 68 may be associated with the reel assembly 66 as described above.

Although the swivel connectors and methods of employing the same have been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the -spirit and scope of the invention, the invention resides in the claims hereinafter appended. Unless otherwise indicated, all numbers or expressions, such as those expressing dimensions, physical characteristics, etc. used in, the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of I and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8. 9.9994, and so forth).

What is claimed is:

1. A swivel for connecting fluid lines in a fluid handling system, the swivel comprising:
   a rotor having an open first end portion, an open second end portion and an open fluid pathway extending between the first and second end portions;
   a housing stem having an open first end portion, an open second end portion, and a fluid pathway extending between the first and second end portions; the first end portion of the housing stem being in open fluid communication with the second end portion of the rotor, whereby the open fluid pathway of the rotor is in open fluid communication with the housing stem;
   a bearing cup having an open housing stem end portion, an open rotor end portion, and an open interior portion; the rotor end portion of the bearing cup being operatively coupled with an exterior surface of the rotor between the first and second end portions of the rotor; the housing stem end portion of the bearing cup being operatively coupled with an exterior surface of the housing stem between the first and second end portions of the housing stem; and
   a bearing assembly having a bearing raceway with surfaces that are at least partially defined by a channel, a bearing wall, and an interior bearing wall within the interior portion of the bearing cup; the bearing channel formed to have a V-shape, having flat opposing first and second walls; the bearing wall and the interior bearing wall within the interior portion of the bearing cup being flat, opposing surfaces that together generally define a V-shape that is open toward an open end portion of the bearing channel; the channel, bearing wall, and interior bearing wall being positioned relative to one another such that: (i) the bearing raceway includes no more than four discreet bearing contact points; (ii) a first circumferential line of contact extends between a bearing contact point on the first wall of the bearing channel and a bearing contact point on the bearing wall; (iii) a second circumferential line of contact extends between a bearing contact point on the second wall of the bearing channel and a bearing contact point on the interior bearing wall, wherein the first circumferential line of contact and second circumferential line of contact are not parallel with one another; and (iv) force exerted upon the bearing raceway from rotation of the rotor with respect to the housing stem is axial.

2. The swivel of claim 1 further comprising:
   a lock ring having an open first end portion and an open second end portion; the lock ring being coaxially coupled with the threaded portion of the exterior surface of the housing stem adjacent the second end portion of the housing stem and closely adjacent the housing stem end portion of the bearing cup.

3. The swivel of claim 1 wherein, the bearing raceway channel is formed in the exterior surface of the rotor, and the bearing wall is formed in the second end portion of the housing stem.

4. The swivel of claim 1 wherein, the bearing raceway channel is formed in the exterior surface of the housing stem, and the bearing wall is formed in the first end portion of the rotor.

5. The swivel of claim 1 wherein:
   the first end portion of the housing stem is provided with mating threads adapted to be operatively connected to a first fluid line in the fluid handling system; and
   the second end portion of the rotor is provided with mating threads adapted to be operatively connected to a second fluid line in the fluid handling system.

6. The swivel of claim 1 further comprising an O-ring seal positioned between the housing stem and the rotor, whereby the passage of fluid from the fluid pathway of the housing stem to the interior portion of the bearing cup is substantially prevented.

7. The swivel of claim 6 wherein the O-ring seal is positioned within an annular recess formed in an interior surface of the housing stem, adjacent the second end portion of the housing stem.

8. The swivel of claim 6 wherein the O-ring seal is positioned within an annular recess formed in an interior surface of the rotor, adjacent the first end portion of the rotor.

9. The swivel of claim 6 further comprising an O-ring dust seal disposed between the exterior surface of the rotor and the rotor end portion of the bearing cup wherein the O-ring dust seal is at least partially disposed within an annular recess formed within an interior surface of the bearing cup.

10. The swivel of claim 6 further comprising an O-ring dust seal disposed between the exterior surface of the housing stem and the housing stem end portion of the bearing cup wherein the O-ring dust seal is at least partially disposed within an annular recess formed within an interior surface of the bearing cup.

11. A fluid handling system, the system comprising:
   a reel assembly having opposite end portions and a line support section located between the opposite end portions; the line support section having a long axis extending through the opposite end portions of the reel assembly;
   an axle having an open first end portion, an open second end portion, and a long axis extending through the first and second end portions; the reel assembly being operatively, rotatably coupled with the axle, whereby the long axis of the axle is positioned coaxially with the long axis of the support section of the reel assembly;
   a swivel, comprising:
      a rotor having an open first end portion, an open second end portion and an open fluid pathway extending between the first and second end portions;
      a housing stem having an open first end portion, an open second end portion, and a fluid pathway extending between the first and second end portions; the second end portion of the housing stem being in open fluid communication with the first end portion of the rotor, whereby the open fluid pathway of the rotor is in open fluid communication with the housing stem; the first end portion of the housing stem being operatively coupled with, the open first end portion of the axle;

a bearing cup having an open housing stem end portion, an open rotor end portion, and an open interior portion; the rotor end portion of the bearing cup being coaxially, operatively coupled with an exterior surface of the rotor between the first and second end portions of the rotor; the housing stem end portion of the bearing cup being coaxially, operatively coupled with an exterior surface of the housing stem adjacent the second end portion of the housing stem; and a bearing assembly having a bearing raceway with surfaces that are at least partially defined by a channel, a bearing wall, and an interior bearing wall within the interior portion of the bearing cup; the bearing channel formed to have a V-shape, having flat opposing first and second walls; the bearing wall and the interior bearing wall within the interior portion of the bearing cup being flat, opposing surfaces that together generally define a V-shape that is open toward an open end portion of the bearing channel; the channel, bearing wall, and interior bearing wall being positioned relative to one another such that: (i) the bearing raceway includes no more than four discreet bearing contact points; (ii) a first circumferential line of contact extends between a bearing contact point on the first wall of the bearing channel and a bearing contact point on the bearing wall; (iii) a second circumferential line of contact extends between a bearing contact point on the second wall of the bearing channel and a bearing contact point on the interior bearing wall, wherein the first circumferential line of contact and second circumferential line of contact are not parallel with one another; and (iv) force exerted upon the bearing raceway from rotation of the rotor with respect to the housing stem is axial.

12. The fluid handling system of claim 11 wherein:
a lock ring having an open first end portion and an open second end portion; the lock ring being coaxially coupled with a threaded portion of the exterior surface of the housing stem adjacent the second end portion of the housing stem and closely adjacent the housing stem end portion of the bearing cup.

13. The fluid handling system of claim 11 wherein:
the open first end portion of the axle having a threaded neck portion that is securably received within a threaded collar formed within the first end portion of the housing stem.

14. The fluid handling system of claim 11 wherein the first end portion of the housing stem is coupled with a terminal end portion of a first fluid line; the first fluid line being at least partially disposed within an open interior of the axle.

15. The fluid handling system of claim 14 wherein the second end portion of the rotor is coupled with one end portion of a second fluid line; the second fluid line being at least partially supported around the line support section of the reel assembly.

16. The fluid handling system of claim 11 wherein the bearing assembly resides within a raceway that is defined by flat surfaces on each of: the bearing channel, the bearing wall, and the interior bearing wall within the interior portion of the bearing cup.

17. The fluid handling system of claim 11 further comprising:
an O-ring seal positioned between the housing stem and the rotor, whereby the passage of fluid from the fluid pathway of the housing stem to the interior portion of the bearing cup is substantially prevented; and
an O-ring dust seal disposed at least partially disposed within an annular recess formed within an interior surface of the bearing cup.

18. The swivel of claim 11 further comprising:
a lock nut, having an open first end portion and an open second end portion; the open first end portion of the lock nut being secured to the open first end portion of the axle; the open second end portion of the lock nut being coaxially positioned around the housing stem, adjacent the first end portion of the housing stem; and
a flange that radiates outwardly from an exterior portion of the first end portion of the housing stem; the flange being positioned between the open first end portion and the open second end portion of the lock nut; the opening in the open second end portion of the lock nut having a diameter that is less than an outer diameter of the flange.

* * * * *